United States Patent Office 2,804,639
Patented Sept. 3, 1957

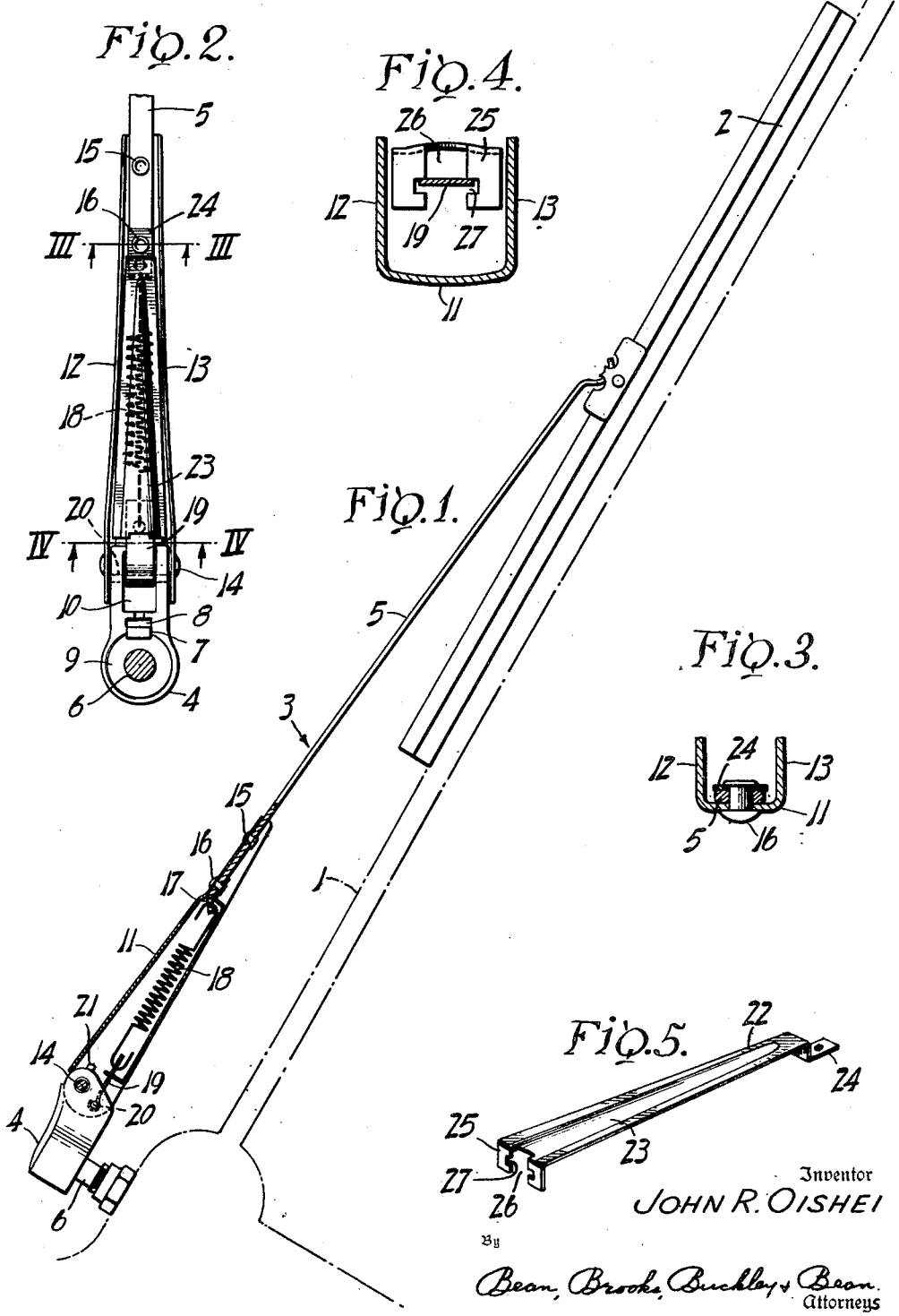

2,804,639

WINDSHIELD CLEANER WIPER ARM

John R. Oishei, Buffalo, N. Y., assignor to Trico Products Corporation, Buffalo, N. Y.

Application November 22, 1952, Serial No. 322,101

8 Claims. (Cl. 15—255)

This invention relates generally to the windshield cleaning art, and more particularly to an improved windshield cleaner wiper arm construction.

Specifically, this invention is concerned with improvements in articulated wiper arms of the type commonly comprising an inner section adapted for attachment to an actuator means and an outer blade-carrying section pivotally connected thereto, with spring means resiliently biasing the blade-carrying section of the wiper arm toward the vehicle windshield whereby the blade is held against the windshield with a predetermined pressure.

It is an object of this invention to provide an improved wiper arm of the aforementioned type wherein the spring means are substantially enclosed so as to be protected.

Another object of the instant invention is to provide an improved articulated wiper arm biased by a coiled spring and having its spring inclosed to the weather in a practical manner.

In addition, it is an object of this invention to provide an improved wiper arm of the aforementioned type wherein the spring means are substantially enclosed in a relatively simple structure to facilitate the assembly of said arm and reduce the expense thereof.

Other objects and advantages of the instant invention will become apparent upon reading the following detailed description thereof, taken together with the accompanying drawing wherein:

Fig. 1 is a side view, partly in section, of the wiper arm of the instant invention, and showing all the parts thereof in assembled position and installed on a vehicle;

Fig. 2 is a bottom plan view of the lower portion of the wiper arm of Fig. 1;

Fig. 3 is a sectional view taken along line III—III of Fig. 2;

Fig. 4 is a sectional view taken along the line IV—IV of Fig. 2; and

Fig. 5 is a perspective view of the cover member of the instant invention.

Referring to the accompanying drawing, there is depicted therein a vehicle windshield 1 and a conventional wiper blade 2 arranged for oscillatory movement across the surface of said windshield to clean the same. Wiper blade 2 is carried by a wiper arm 3 having an inner mounting section 4 and an outer blade-carrying section 5. Mounting section 4 is secured on a conventional drive shaft 6 with a force fit, whereby said mounting section moves with said drive shaft, and blade 2 is carried at the outer end of section 5, being attached thereto in a conventional manner. A resilient spring-type latch 7 is carried within a latch chamber 8 in mounting section 4, and resiliently extends beneath the enlarged outer end portion 9 of drive shaft 6, whereby mounting section 4 is secured in place on drive shaft 6.

Mounting section 4 is radially channeled, as at 10, and a channel member 11, having side portions 12 and 13 and forming a part of section 5, is secured to the channeled portion 10 of section 4 by means of a pivot pin 14. Section 5 of arm 3 is secured to channel member 11 by means of one or more rivets such as are illustrated at 15 and 16, whereby section 5 is fixedly secured to member 11 for movement therewith. Thus, section 5 is pivotally mounted on section 4 for movement about pivot 14 and through a plane perpendicular thereto.

At its inner end, section 5 is formed with a flanged portion having an aperture 17, and one end of a coil spring 18 is passed through said aperture to secure said spring to section 5. At its other end, spring 18 is secured to section 4 by means of a connector plate 19 which is attached to a pin 20 spaced beneath pin 14 and extending across channel 10. Spring 18 and plate 19 together constitute a spring assembly for the articulated arm 3. The length of plate 19 and spring 18, and the strength of the latter, are carefully regulated whereby spring 18 exerts a predetermined force biasing section 5 of arm 3 about pivot 14 and toward windshield 1. At the same time, arm 3 can be pivoted about pin 14 away from windshield 1 whenever it is desired to remove blade 2 from the surface of said windshield, as, for example, when it is desired to clean or replace said blade. Mounting section 4 is also provided with a flange portion 21 extending beyond channeled portion 10 and designed to abut the inner top portion of member 11 to provide a stop against inward pivoting of member 11 under the influence of spring 18 beyond a predetermined point.

A cover member 22 is mounted beneath spring 18 to enclose and protect the same, and comprises an elongated, generally flat, member centrally ribbed as at 23 for greater strength and rigidity. Member 22 is provided at one end with an offset, apertured, flange portion 24, and at its other end with a flange portion 25 extending at substantially a right angle to said member. Portion 25 is longitudinally slotted as at 26 to provide a slot of less width than plate 19, and is transversely slotted as at 27 to provide a slot adapted to slidably receive and retain plate 19. Also, cover member 22 is of tapered width to conform in plan view with the shape of member 11.

Cover member 22 is fitted in place along the lower and open side of channel member 11, with portion 24 being secured to the inner end of section 5 by rivet 16, and with portion 25 extending inwardly of member 11 and fitting around plate 19 with said plate slidably retained in slot 27. The flange portion 25 constitutes a spaced to support the cover off the spring at all times of arm adjustment to avoid rubbing contact. Therefore, the sliding connection between cover member 22 and plate 19 avoids interference with the proper functioning of spring 18, and eliminates any need for securing member 22 to member 11 at that point. The cover member 22 co-operates with channel member 11 to substantially enclose spring 18. It is readily installed in place, and the plasing exterior appearance of channel member 11 is preserved.

Therefore, it is readily apparent that the instant invention fully accomplishes its aforesaid objects and provides an articulated wiper arm wherein the resilient biasing means are substantially enclosed and protected in a practical manner by a structure which is inexpensively manufactured and readily assembled.

Obviously, certain modifications of the specific embodiment herein disclosed will occur to those skilled in the art, and it is intended that the instant invention be limited solely by the scope of the appended claims.

Having fully disclosed the instant invention in a preferred embodiment thereof, and having completely described its mode of operation, what is claimed as new is as follows:

1. A wiper arm for a windshield cleaner comprising, a mounting section adapted to be secured to a drive means, a blade-carrying section hinged to said mounting section, a coil spring connected at one end to said blade-carrying section, connector means connecting the other end of said spring to said mounting section, said spring acting to swing said blade-carrying section about the hinge axis, and elongated cover means enclosing said spring, said cover means being anchored at one end thereof to said blade-carrying section for swinging therewith and having at its opposite end inwardly directed flange means providing a guide formation slidably receiving said connector means and supporting said cover means off said spring to avoid rubbing contact therewith.

2. An articulated wiper arm for windshield cleaners comprising, a mounting section adapted for engagement with a drive member, a blade-carrying section having a pivotal connection with said mounting section, spring means extending between said two sections and tending to rotate said blade-carrying section about said pivotal connection, and cover means cooperating with said blade-carrying section to substantially enclose said spring means, said cover means being secured adjacent one end thereof to said blade-carrying section, and the other end of said cover means being inwardly directed and formed to slidably receive said spring means.

3. A wiper arm for windshield cleaners, said wiper arm comprising a first section adapted for connection with an actuator and having a pivot, a second section adapted to carry a wiper blade at one end and connected at its other end to said pivot, said second section including a channel portion, a spring assembly extending along said channel portion between said sections and exerting a force tending to rotate said second section about said pivot, and a cover member secured at one end to said second section and extending along the open side of said channel portion to substantially enclose said spring means, the other end of said cover member being slidably supported by the adjacent end of said spring assembly.

4. An articulated wiper arm for windshield cleaners, said wiper arm comprising a mounting section adapted to engage an actuator and having a pivot, a blade-carrying section connected to said pivot and having a substantially U-shaped channel portion, a spring assembly extending along said channel portion between said blade-carrying section and a point on said mounting section spaced from said pivot to bias said blade-carrying section about said pivot, and a cover plate extending along the open side of said channel portion to substantially enclose said spring assembly, said cover plate being fastened at one end to said blade-carrying section and having its other end slidably supported by an inner portion of said spring assembly.

5. An articulated wiper arm for windshield cleaners, said wiper arm comprising a mounting section adapted for attachment to an actuator, said mounting section having a pivot and a connection device adjacent said pivot, a blade-carrying section connected to said pivot and having an open-sided channel portion, coil spring means housed within said channel portion and connected at one end to said blade-carrying section, connector means securing the other end of said coil spring means to said connection device, and a cover member secured at one end to said blade-carrying section and extending along the open side of said channel portion to substantially enclose said spring means, the other end of said cover member being slotted for slidably receiving said connector means.

6. A windshield cleaner wiper arm comprising an inner section adapted for attachment to an actuator, said inner section having a pivot and a connection device spaced from said pivot, an outer section mounted on said pivot and adapted to carry a wiper blade, said outer section having a channel portion adjacent said inner section, coil spring means within said channel portion and connected at one end to said outer section at a point spaced from said pivot, a connector plate secured at one end to said connection device and at its other end to the other end of said coil spring means, and a cover plate extending along the open side of said channel portion to substantially enclose said spring means, one end of said cover plate being secured to said outer section, the other end of said cover plate being extended inwardly of said channel portion and being transversely slotted to slidably receive said connector plate.

7. A windshield cleaner wiper arm comprising an inner section adapted for attachment to an actuator, said inner section having a pivot and a connection device spaced from said pivot, an outer section mounted on said pivot and adapted to carry a wiper blade, said outer section having a channel portion adjacent said inner section, coil spring means within said channel portion and connected at one end to said outer section at a point spaced from said pivot, a connector plate secured at one end to said connection device and at its other end to the other end of said coil spring means, and a cover plate extending along the open side of said channel portion to substantially enclose said spring means, one end of said cover plate being secured to said outer section, the other end of said cover plate being extended inwardly of said channel portion and having a longitudinal slot of less width than said connector plate and a transverse slot of greater width than said connector plate, whereby said other end of said cover plate can be threaded around said connector plate and said connector plate will be slidably retained in said transverse slot.

8. A windshield cleaner wiper arm comprising an inner mounting section adapted for connection to an actuator, said mounting section having a pivot device and a connection device, a channel member mounted adjacent one end thereof on said pivot device, an outer blade-carrying section, fastening means securing said blade-carrying section to the other end of said channel member, coil spring means within said channel member and connected at one end to said blade-carrying section, a connector plate secured at one end to said connection device and at its other end to the other end of said coil spring means, and a cover plate extending along the open side of said channel member to substantially enclose said spring means, one end of said cover plate being secured to said blade-carrying section by said fastening means, the other end of said cover plate being extended inwardly of said channel member and being slidably fitted to said connector plate.

References Cited in the file of this patent
UNITED STATES PATENTS

| | | |
|---|---|---|
| 2,332,660 | Mussen | Oct. 26, 1943 |
| 2,443,976 | Baldwin | June 22, 1948 |
| 2,528,258 | Zaiger | Oct. 31, 1950 |
| 2,557,755 | Nesson | June 19, 1951 |